[11] 3,602,573

[72] Inventor David W. Kermode
Ridgecrest, Calif.
[21] Appl. No. 729,285
[22] Filed May 15, 1968
[45] Patented Aug. 31, 1971
[73] Assignee The United States of America as
represented by the Secretary of the Navy

[54] COLOR ANALYSIS OPTICAL SURVEILLANCE SYSTEM
3 Claims, 2 Drawing Figs.

[52] U.S. Cl. .................................... 350/148,
350/170, 350/174
[51] Int. Cl. .................................... G02b 5/30,
G02b 27/28
[50] Field of Search .......................... 350/148,
170, 174

[56] References Cited
UNITED STATES PATENTS
| | | | |
|---|---|---|---|
| 3,338,131 | 8/1967 | Klein | 350/174 |
| 3,352,965 | 11/1967 | Driver et al. | 178/6 |
| 2,983,183 | 5/1961 | Pickering | 350/174 |

*Primary Examiner*—Rodney D. Bennett, Jr.
*Assistant Examiner*—Daniel C. Kaufman
*Attorneys*—George J. Rubens and Roy Miller

ABSTRACT: An optical system for improving target visibility comprising a prism which separates light reflected from the scene into its various color wavelengths and a set of cross polarized color polarized filters capable of rotation with respect to the prism to provide color contrast enhancement.

PATENTED AUG31 1971　　　3,602,573

INVENTOR.
DAVID W. KERMODE
BY
ROY MILLER
ATTORNEY.

COLOR ANALYSIS OPTICAL SURVEILLANCE SYSTEM

GOVERNMENT INTEREST

The invention described herein may be manufactured and used by or for the Government of the United States of America for governmental purposes without the payment of any royalties thereon or therefor.

BACKGROUND OF THE INVENTION

It is frequently desirable to enhance the visibility of persons and objects in contrast to the general background. Limitations of the naked eyes for this purpose are numerous and well known.

The contrast ratio of an object with respect to its background is related to the size of the object relative to the background. Image-magnifying devices such as telescopes and field glasses have been employed as visual aids. Further improvement to visual surveillance can be achieved by either increasing color contrast between objects, or by causing the object and the background, or both to assume unusual color appearances.

Hue is dependent upon the relative intensity of mixed light wavelengths, as well as the wavelengths themselves. The polarization of light is an important factor related to the intensity of the light reflected from an object.

SUMMARY OF THE INVENTION

In accordance with the present invention, means are provided to change the color contrast of an object with respect to its background.

Reflected light from a point source may have a given intensity and hue. The light reflected from an adjacent point may reflect a different intensity and hue. The present invention takes advantage of these characteristics.

In the present invention a prism is provided to shift the wavelengths of the light passing through it in different degree. Thus, a scene, as viewed through the prism, develops new intensities and hues caused by overlapping of the shifted wavelengths of the reflected light.

The light exiting from the prism, which may be polarized, then passes through cross polarized filters. The color polarization of the prismatically shifted light wavelengths causes intensities of the component light wavelengths to be altered relative to each other, and the hue of the scene is accordingly altered.

DESCRIPTION OF THE PREFERRED EMBODIMENTS

Figure 1:
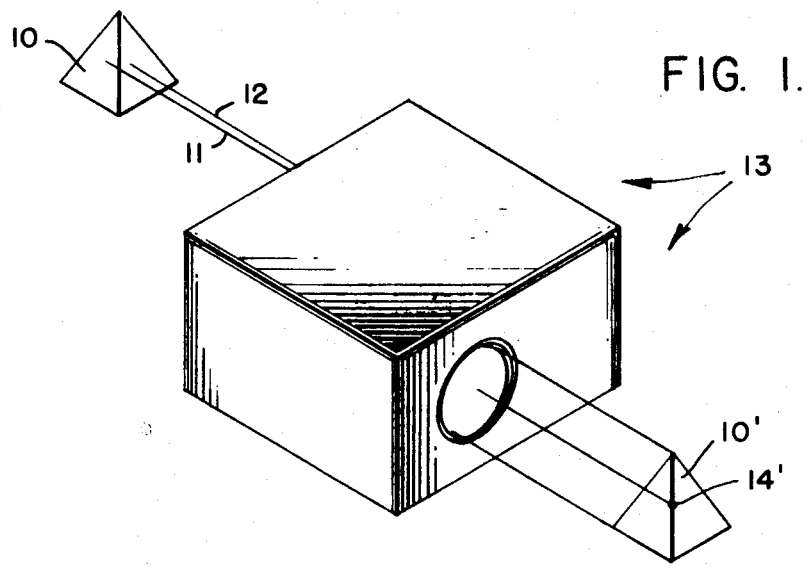
FIG. 1 is a perspective view of an embodiment of the invention.

FIG. 1 shows an optical surveillance system 13 in use to enhance the contrast of two adjacent faces of a target 10.

Light ray 11 is reflected from a point just to the left of the interface between the two sides shown of target 10. Light ray 12 is reflected from a point just to the right of the interface between the two sides of target 10.

Figure 2:
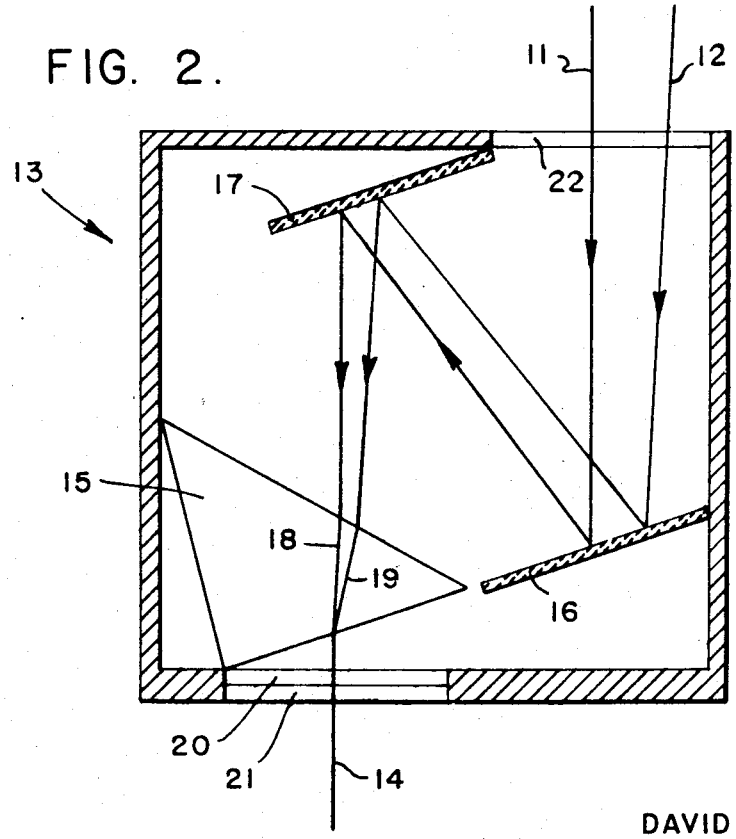
FIG. 2 is a plan view of the invention with the top cover removed.

Light rays 11 and 12 enter system 13 through window 22 as shown in FIG. 2. Because of the relative angle of target 10 to the source of illumination, light ray 11 will have a slightly different intensity and hue from that of light ray 12.

Virtual image 10' appears to the viewer. The intersection of the two sides of target 10 is enhanced and appears to the viewer as fringe 14'.

System operability depends on the phenomena that light rays reflected from surfaces placed at different angles with respect to the source of illumination exhibit slightly varying intensities and hues.

Referring to FIG. 2, light rays 11 and 12 enter system 13 through window 22 and impinge upon fully reflective mirror 16. Mirror 16 is placed parallel to a second mirror 17 which receives the light rays reflected off mirror 16 and directs rays 11 and 12 onto the surface of a prism 15. Mirror angles relative to a plane at right angles to the line of view are related to the angular position of the prism. The angular placement of the prism is dependent upon the index of refraction of the prism.

Prism 15 refracts ray 11 into ray 18, and ray 12 into ray 19. Rays 18 and 19 may overlap to form ray 14. Whether rays 18 and 19 overlap depends upon the relative difference in wavelengths between ray 11 and ray 12 and the angles at which they impinge upon prism 15. When looking at any object, unless the surface is completely flat, rays reflected from that object will result in a variety of subtle changes in hue and intensity. Because of the many different angles that light rays can reflect off a surface which is not flat, it is probable that two rays will be refracted by prism 15 so that they overlap and form a new ray 14 as shown.

Thus the system relies on this phenomena of overlapping of refracted rays to enhance relative contrast of an object to its background.

To provide for further intensification of the above described phenomena, a color polarized filter may be placed in the path of ray 14.

FIG. 2 shows a set of cross polarized color polarized filters 20 and 21 placed in the path of ray 14. For example, filter 20 may be red, and filter 21 may be blue. By placing the polarization plane of filter 20 at a right angle to the polarization plane of filter 21, image intensification may be had for two tonal ranges merely by rotating the cross polarized filters with respect to prism 15.

Thus, in use, device 13 is scanned across a selected field of view. A camouflaged object will develop a fringe around its outline where the angle of incidence of the light reflected from the camouflaged object is different from the angle of incidence of the light reflected from the background.

This difference in angles of incidence results in the fringe being formed around the edge of the object resulting in an outline, permitting the object to be more easily detected from its background.

System 13 may be used in combination with a magnifying device to improve its range.

It should be understood of course, that the foregoing disclosure relates only to a preferred embodiment of the invention and that numerous modifications or alterations may be made therein without departing from the spirit and the scope of the invention.

What is claimed is:

1. An optical surveillance system which reduces the effect of camouflage and increases target visibility comprising:
    prism means,
    means for collecting the light reflected from the scene under surveillance and directing the light to said prism, so that light rays arriving at the prism from adjacent points are not parallel to each other;
    said prism means separating said light collected into its various color components and forming new hues due to overlapping of color components caused by prism dispersion of light arriving from adjacent points; and
    means for color polarizing said overlapping light components to change the relative contrast of the target with respect to its background.
2. The system of claim 1 wherein:
    the color polarizing means are capable of rotation with respect to said prism.
3. The system of claim 2 wherein:
    the rotatable color polarizing means comprise:
    a first polarized filter having color sensitivity to only a first color;
    a second polarized filter having color sensitivity to only a second color; and
    the direction of light polarization of said first filter is perpendicular to the direction of light polarization of said second filter.